United States Patent [19]

Wada et al.

[11] 4,027,346

[45] June 7, 1977

[54] POLYESTER FIBER TREATED WITH ANIONIC POLYALKYLENE OXIDE EMULSIFIED POLYESTER POLYETHER FINISH

[75] Inventors: Masahiro Wada, Moriguchi; Masakazu Date, Takatsuki, both of Japan

[73] Assignee: Toyo Boseki Kabushiki Kaisha, Osaka, Japan

[22] Filed: Apr. 23, 1975

[21] Appl. No.: 570,962

[30] Foreign Application Priority Data

Aug. 21, 1974 Japan .............................. 49-96570

[52] U.S. Cl. ........................................ 8/30; 8/1 W;
8/18 R; 8/115.6; 8/116 P; 8/169; 8/173;
252/8.1; 252/301.1 W; 260/75 T; 427/158;
427/390 D; 428/411

[51] Int. Cl.$^2$ ........................................ D06P 1/613

[58] Field of Search .................. 8/115.6, 173, 30;
428/482; 427/400; 252/8.9; 260/29.2 E

[56] References Cited

UNITED STATES PATENTS

| | | | |
|---|---|---|---|
| 3,416,952 | 12/1968 | McIntyre et al. | 428/482 |
| 3,512,920 | 5/1970 | Dunlop | 427/400 |
| 3,625,754 | 12/1971 | Dunn | 8/115.6 |
| 3,893,929 | 7/1975 | Basachur | 260/29.2 E |

OTHER PUBLICATIONS

Ward, Rayon and Synthetic Textiles, Sept. 1951, pp. 100, 101 & 104.

*Primary Examiner*—Donald Levy
*Attorney, Agent, or Firm*—Wenderoth, Lind & Ponack

[57] ABSTRACT

A modifying process for polyester synthetic fiber products wherein said polyester synthetic fiber products are dipped into a treating liquor having an aggregation initiating temperature in the range of 65° – 125° C and then treated by heating them to temperatures at least 1° C higher than said aggregation initiating temperature. Said treating liquor is prepared by adding to an aqueous dispersed liquid of a polyester polyether block copolymer (1) a anion-nonion or nonion surface active agent which serves to improve the high temperature stability of said block copolymer dispersed liquid, (2) an adsorption promoting or aggregation temperature adjusting agent which serves to increase the affinity of said block copolymer to the polyester synthetic fibers and improve the sorption power of said block copolymer and, if desired, (3) dyestuffs and carriers.

19 Claims, No Drawings

POLYESTER FIBER TREATED WITH ANIONIC POLYALKYLENE OXIDE EMULSIFIED POLYESTER POLYETHER FINISH

BACKGROUND OF THE INVENTION

This invention relates to a surface modifying process for synthetic polyester fiber products in the form of filament, fiber, woven fabric, knitted fabric and nonwoven fabric.

Because of their excellent physical properties, polyester fibers are recently utilized for a wide variety of purposes not only for manufacturing underwears and outerwears but also for making household goods such as bed sheets and carpets. Polyester fibers, however, are disadvantageous in that they have large hydrophobic properties and, when used in the form of wears, present only a limited sweat absorbing property and hence give a stuffy feeling. Also, polyester fibers easily absorb oily stains which, once absorbed, cannot be removed easily, and are readily charged with electricity so that they attract dusts and, when used in the form of wears, stick to the body while putting them on and, when used as a carpet, sometimes give an electric shock.

To eliminate these disadvantages, many methods have been proposed heretofore. One example is a method disclosed by McIntyre et al in the U.S. Pat. No. 3,416,952, wherein polyester fiber products are treated with a polyester polyether block copolymer prepared from terephthalic acid, alkylene glycol and polyalkylene glycol. However, a treating liquor containing such block copolymer is not stable against heat and, with a slightest temperature rise, the block copolymer which is being dispersed in the liquor starts aggregating. Accordingly, it is actually impracticable to treat the polyester fiber products properly with such liquor. On the other hand, although it is known that when a specific emulsifying agent or dispersing agent is added to said block copolymer the block copolymer dispersed liquor is stabilized, the fibers, even when they are dipped in a long bath (diluted solution having a large liquor ratio), cannot be modified enough due to the excessively low degree of exhaustion of said block copolymer into the fibers. Therefore such stabilized block copolymer is exclusively employed in only an ordinary pad dry cure process. This process, however, involves dangers that water spots are occured unless a rinsing and drying step is carried out after treatment and that the resulting treated fibers present treatment effects having a reduced durability. Thus, it has been intensively desired to simplify the process of the pad dry cure method and yet to improve the modifying effect.

SUMMARY OF THE INVENTION

It is therefore a primary object of this invention to impart excellent hydrophilic, dust proofing, stain removing, antisoil redeposition and antistatic properties to polyester fiber products by subjecting them to a simple dipping treatment.

Another object of this invention is to impart highly durable modifying effects, which are improved over those attained by a high temperature dry-heating process, to polyester fiber products by dipping them into a long bath (increased liquor ratio) of diluted solution to thereby allow the treating agent being adsorbed onto the fiber products effectively and being penetrated into the swelled fiber surface layer.

Still another object of this invention is to effect the above-mentioned surface modifying treatment simultaneously with bleaching, dyeing and/or other various processings to achieve such processings uniformly.

These and other objects and advantages of this invention will become apparent from reading the following description.

As a result of intensive studies the inventors established an effective method for treating polyester fiber products in a liquor. More specifically, the inventors prepared a treating liquor by adding to an aqueous dispersed liquid of a polyester polyether block copolymer, which was prepared from terephthalic acid and/or isophthalic acid or one or more lower alkyl esters of these acids, a lower alkylene glycol and a polyalkylene glycol, (a) a surface active agent expressed by a general formula (I)

(where, R is an alkyl, alkenyl or alkylaryl group; $R_1$ is a hydrogen atom or a methyl group; A is a $-SO_3$, $-(CH_2)mSO_3$ or $-PO_3$ group; ($m$ is an integer of 2 or 3); M is a hydrogen atom, or an ammonium, substituted ammonium or lower alkyl groups or an alkali metal; $n$ is an integer in the range of 4 – 20) and (b) an adsorption promoting agent or aggregation temperature adjusting agent which serves to adjust the aggregation initiating temperature to 65° – 125° C, and the inventors found that, by dipping polyester synthetic fibers into said treating liquor and then treating them at temperatures at least 1° C higher than the aggregation initiating temperature of said treating liquor the sorption of said processing agents into the polyester synthetic fibers was to be accelerated to impart excellent endurable hydrophilic, dust proofing, antisoil redeposition and antistatic properties to the fibers.

In the method of this invention by suitably controlling the aggregation initiating temperature and treating temperature of said liquor, it becomes possible to uniformly and effectively adsorb and them diffuse or penetrate said block copolymer into the polyester fiber products and hence to impart excellent hydrophilic, dust proofing, antisoil redeposition and antistatic properties to the fiber products which are more durable than those attained by the conventional pad dry cure process. The method of this invention is also advantageous in that the processing for the polyester fiber products can be greatly simplified because of the fact that a dyeing finishing process or bleaching process can be effected simultaneously with the treatment of this invention in the same bath. Furthermore the method of this invention exhibits particularly improved effects in an absorbing treatment in which the polyester fiber products are dipped into a bath containing a diluted liquor of said treating agents. After completing the absorbing process, sufficient modifying effects can be obtained only by drying the polyester fiber products, and the problem of the occurrence of water spots are eliminated. Thus in view of saving energy, the method of this invention has large industrial merits.

DETAILED DESCRIPTION OF THE INVENTION

When a dilute aqueous dispersed liquor of a block copolymer as used in this invention for treating polyester fiber products is introduced into a test tube and warmed within a thermostatic bath at a rate of 5° C/min., the block copolymer starts aggregation upon a certain temperature is reached. This temperature is called herein aggregation initiating temperature which varies depending on the composition and molecular weight of the block copolymer employed, the type and concentration of the surface active agent and the type and added quantity of the adsorption promoting agent or aggregation temperature adjusting agent used.

The principle that by the method of this invention various excellent and endurable properties are imparted to the polyester fiber products, although not perfectly comprehended yet, may be explained as follows:

In the block copolymer dispersed liquid, a water molecule is coordinated by a hydrogen bond to the oxygen atom in the polyalkylene ether group contained in the copolymer and hence the copolymer is self-dispersed in the water of normal temperature. Said coordinated water molecule, however, is removed upon the application of a slightest heat and the dispersibility of the copolymer within water is lowered until at last the copolymer is aggregated and precipitated. When dispersed without using any surface active agent, the block copolymer of this invention normally has an aggregation initiating temperature in the range of 30° – 65° C. A treating liquor prepared by adding a surface active agent as expressed by said formula (I) to the above-mentioned block copolymer dispersed liquid is remarkably stabilized by the excellent dispersing action of said surface active agent and becomes not to be aggregated even at higher temperatures due to the presence of anion group. In such a stabilized treating liquor the exhaustion degree of the block copolymer into the fibers is negligible and therefore it is hardly possible to impart endurable modifying effects to the polyester fiber products especially by a long bathing process which is carried out by use of a diluted treating liquor. According to this invention, an adsorption promoting agent or aggregation temperature adjusting agent is added to the stabilized block copolymer dispersed liquor so that the resulting liquor has an aggregation initiating temperature lower than the temperature at which the polyester fiber products are treated. Also the aggregation speed of the treating liquor is varied due to the presence of the surface active agent and, while forming fine aggregates, the processing agents is exhausted into the polyester fibers uniformly and effectively. When subjected to an exhaustion treatment using said liquor, ingredients having higher affinities to the polyester fibers are selectively exhausted and water-soluble ingredients having lower affinities are left in the residual liquid, so that the resulting treated fibers will have an improved fastness against washing. In contrast with this, when the fibers are treated by the conventional pad dry cure method, even the water-soluble ingredients having lower affinities will be imparted. As a result, when washing the thusly treated fibers, the ingredients having lower affinities will act to disperse the ingredients having higher affinities, thereby promoting the removal of the latter. This means that the fiber products treated by the conventional pad dry cure method presents only insufficiently durable properties.

According to the method of this invention, the polyester fibers are treated within a bath in a state that they are swelled to a certain degree, or in a state that the dyestuff employed can be diffused into the fibers, and therefore the block polymer, although not to such a high degree as of the dyestuff, is penetrated into the surface layer of fibers. The degree of penetration becomes higher as the treating temperature is elevated and by the application of a dyeing carrier. Also, the degree of penetration increases in treating modified polyester fibers which carry micro-pores formed in their surface layer. Such an anchoring effect contributes to impart a large fastness against washing to the fibers treated by the method of this invention.

When the treating liquor used in this invention is made acidic, the block copolymer can be easily approached to the polyester fibers by decreasing zeta-potential of the fiber, thereby the amount of the block copolymer on fibers is increased, and the treated fibers will have increasedly durable properties.

For the above-mentioned reasons, in the method of this invention the drying and heating process is eliminated, but after completing treatment the fibers may simply be dried or, if necessary, subjected to a final tentering process.

The polyester synthetic fiber products to which the method of this invention can be applied may include filaments, fibers, threads, slivers, woven fabrics, knitted fabrics and non-woven fabrics made of polyethylene terephthalate, polyethylene terephthalate isophthalate, polyethylene terephthalate parahydroxybenzoate and polyethylene terephthalate butylene terephthalate. Other examples of the polyester synthetic fiber products are blended yarns and fabrics of said polyester fibers and natural, regenerated, semi-synthetic and synthetic fibers other than said polyester fibers. The fiber products which can be treated by the method of this invention may also include yarns, slivers, woven fabrics, knitted fabrics and nonwoven fabrics made of modified polyester fibers which have been modified during the polycondensation and/or spinning process (e.g. polyester fibers dyeable with acid dyestuffs and/or basic dyestuffs, antistatic polyester fibers and incombustible polyester fibers) and modified polyester fibers which have been modified by an after-treatment (e.g. polyester fibers prepared from the graftcopolymerization of vinyl monomers). These modified polyester fiber products have a large degree of exhaustion for the processing agents and can be treated conveniently by the method of this invention.

Examples of polyester polyether block copolymers which are employed in this invention and consisting of terephthalic acid and/or isophthalic acid or one or more lower alkyl esters of these acids, alkylene glycol and polyalkylene glycol are: terephthalic acid-alkylene glycol-polyalkylene glycol, terephthalic acid-isophthalic acid-alkylene glycol-polyalkylene glycol, terephthalic acid-alkylene glycol-polyalkylene glycol monoether, terephthalic acid-isophthalic acid-alkylene glycol-polyalkylene glycol monoether. To obtain durable effects, said block copolymer may preferably contain terephthalate units and isophthalate units in the proportion of 100 : 0 – 50 : 50 (molar ratio) and, to facilitate the dispersion of the block copolymer, may preferably be in the proportion of 90 : 10 – 50 : 50 (molar ratio). Also said block copolymer may contain the terephthalate units + isophthalate units and polyalkylene glycol units in the proportion of 2 – 15 : 1 (molar ratio) and, when the durability of effects, dispersibility in water and exhaustion into fibers are to be considered, may preferably be in the proportion of 3 – 8 : 1 (molar ratio).

Alkylene glycols which can be employed for preparing said block copolymers are those having 2 – 10 carbon atoms such as ethylene glycol, propylene glycol, tetramethylene glycol and decamethylene glycol. On the other hand, polyalkylene glycols may be those normally having an average molecular weight in the range of 600 – 12,000, preferably in the range of 1,000 – 5,000, and may include polyethylene glycol, polyethylene glycol-polypropylene glycol copolymer, polyethylene glycol-polytetramethylene glycol copolymer, polypropylene glycol and polyhydric alcohol-ethylene oxide adduct etc.. Other examples of usable alkylene glycols are monophenylethers, monoethylethers and monomethylethers of polyethylene glycol and polypropylene glycol. Of all these polyalkylene glycols, monoethers of polyalkylene glycols are most preferred in consideration of the resulting hydrophilic property and stain removing properties.

The average molecular weights of said block copolymers, although varying depending on the molecular weight of polyalkylene glycol which is used as the main component, are normally in the range of 2,000 – 20,000, preferably 3,000 – 10,000. Block copolymers having average molecular weights less than 2,000 will give only insufficient modifying effects and durable properties, whereas block copolymers having average molecular weights exceeding 20,000 will have reduced dispersibilities and give reduced stain removing properties. For the purpose of controlling the average molecular weight during the polycondensation process also, the polyalkylene glycols in the form of monomethylether, monoethylether and monophenylether which are closed at one end group thereof may be employed most preferably. The aggregation initiating temperature of the block copolymer dispersed liquor, which has been prepared without using any surface active agent, is normally in the range of 30° – 65° C and preferably 45° – 60° C. The application quantity of said block copolymer is normally in the range of 0.02 – 5.0 wt.%, preferably 0.1 – 3.0 wt% of the fiber product to be treated.

Preferred examples of surface active agents which are usable in the method of this invention and expressed by general formula (I) are anion and nonion surface active agents as expressed by the following formulas:

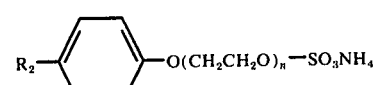  (II)

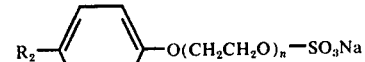  (III)

$R_3$—O(CH$_2$CH$_2$O)$_n$—SO$_3$NH$_4$  (IV)
$R_3$—O(CH$_2$CH$_2$O)$_n$—SO$_3$Na  (V)

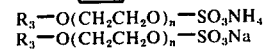  (VI)

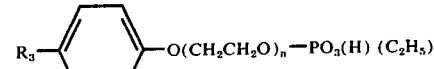  (VII)

(where, $R_2$ is an alkyl group having a carbon number of 3 or more, preferably in the range of 9 – 18; $R_3$ is an alkyl group having a carbon number of 6 or more, preferably in the range of 8 – 25; $n$ is an integer in the range of 4 – 20.)

Of these surface active agents the most preferred are anion surface active agents of sulfate type of alkylaryl polyether as expressed by formulas (II) and (III).

The application quantity of these surface active agents varies depending on the composition and molecular weight of the block copolymer used, pH of the treating liquor, quantity of salt to be added and treating temperature, and is normally 0.01 – 50 g, preferably 0.3 – 20 g, more preferably 0.5 – 3 g of surface active agents as expressed by formulas II, III and VI and 1 – 5 g of surface active agents as expressed by formulas IV, V and VII per each $l$ of the treating liquor. When applied in the quantity less than 0..01 g/$l$, the treating liquor cannot be stabilized sufficiently and, when the treating liquor heated above its aggregation initiating temperature, the block copolymer is aggregated into very large particles, resulting in the occurrence of adhesion spots. Moreover, these large particles can hardly be diffused into the fibers, making it difficult to realize durable modifying effects. On the other hand, when said surface active agents are applied in the quantity more than 50 g/$l$, the desired aggregation initiating temperature of the treating liquor cannot be realized unless a large quantity of adsorption promoting agent or aggregation temperature adjusting agent is added. Also the adsorption of block copolymer onto the fibers may be prevented and, when dyeing the fibers simultaneously, the dyestuff employed may disadvantageously be aggregated. Said surface active agents may be added to the aqueous liquor in which the block copolymer is dispersed or, otherwise, a molten block copolymer may directly be added and dispersed into the aqueous solution of said surface active agents.

According to the method of this invention, the treating liquor is prepared by adding an adsorption promoting agent or aggregation adjusting agent to an aqueous dispersed liquid containing said block copolymer and surface active agent so that the treating liquor has an aggregation initiating temperature in the range of 65° – 125° C, preferably 95° – 125° C. The terms of adsorption promoting agent and aggregation temperature adjusting agent means the agents which improve the affinity of the polyester polyether block copolymer to polyester fibers in the treating liquor and increase the exhaustion degree of said block copolymer to the polyester fibers for a diluted solution. These agents may include acids and water-soluble salts. Examples of such acids may be organic acids such as formic acid, acetic acid, oxalic acid, sulfamic acid and monochloroacetic acid; inorganic acids such as hydrochloric acid and phosphoric acid; esters such as glycol acetate, glycol diacetate, monoacetin, diacetin and triacetin; chlorohydrins such as monochloroglycerin, dichloroglycerin, cyclic esters such as lactone and sultone. Of these acids, latent acids which are hydrolyzed at high temperatures and form acids are especially preferred for realizing a uniform treatment and, when dyeing simultaneously, a uniform dyeing. The application quantity of such acid varies depending on the acid employed, temperature elevating speed and treating temperature; normally in such a range that the pH of the treating liquor becomes 2 – 7, preferably 3 – 6. However, when a latent acid is used, it may be allowed that the pH of the bath is ultimately in the range less than 2. The water-soluble salts usable as the adsorption promoting agents or aggregation temperature adjusting agents may be salts which contain anions having a larger salting-out power (hydration power) than bromine anion and salts which contain cations having a larger salting-out power than potassium cation (in case of monovalent salts) and than barium cation (in case of divalent salts). In addition to all these conditions, salts containing cation groups such as $NH_4^+$, $Na^+$, $Li^+$, $K^+$ and $Mg^{++}$ and salts containing anion groups such as $SO_4^{--}$, $CH_3COO^-$, $Cl^-$ and $Br^-$ are preferred. Examples of such water-soluble salts are ammonium sulfate, sodium sulfate, sodium acetate, ammonium chloride and sodium chloride. When controlling the aggregation initiating temperature by means of a water-soluble salt, the pH of the treating liquor may be adjusted to 2 – 10, preferably to 3 – 6. According to this invention when a considerably large quantity of said surface active agent (normally more than 0.3 g/l) is used to control the aggregation initiating temperature by means of both acid and water-soluble salt, finely aggregated particles of block copolymer are formed to thereby realize a uniform adhesion of the block copolymer to the fibers, and hence the exhaustion degree of block copolymer to the fibers are increased.

Then in the thusly prepared treating liquor which is maintained at temperatures lower than its aggregation initiating temperature, the polyester synthetic fiber products to be treated are dipped and then the treating liquor is heated. In this case, however, rapid heating of the treating liquor is not preferred because it may result in the occurrence of adhesion spots of the block copolymer and the reduction in diffusibility of the block copolymer into the fibers. The temperature elevating speed is normally less than 10° C/min, preferably 1° – 5° C/min. This precaution, however, is unnecessary when the aggregation initiating temperature is controlled by means of, mainly, a latent acid. According to this invention the polyester fiber products are treated within a liquor by heating the liquor to temperatures at least 1° C, preferably 5° C higher than its aggregation initiating temperature. After the time when almost all the block copolymer having been exhausted, the fiber modifying effects are generally improved more and more as the treating liquor is heated to increasingly higher temperatures. Nevertheless, when the treating liquor is heated at a relatively large speed, it may be preferred for realizing a uniform adhesion of the block copolymer onto and a uniform diffusion of the block copolymer into the polyester synthetic fiber products to treat the fiber products at temperatures higher than the treating liquor's aggregation temperature by 1° – 25° C. The treating temperature is normally in the range of 66° – 150° C, preferably 80° – 140° C. However, when considering the uniformity of treatment, the durability of treatment effects and the evenness of simultaneous dyeing, the most preferred treating temperature is in the range of 100° – 140° C and the treating time is normally 5 – 120 min., preferably 30 – 60 min.

When the polyester synthetic fiber products are treated with a treating liquor containing a dyeing carrier for said fiber products or when the polyester synthetic fiber products which have been treated previously with a dyeing carrier are treated by the method of this invention, a further improved diffusibility of the block copolymer into the fibers may be attained and hence modifying effects having improved durability may be imparted to the fibers. Examples of such dyeing carriers include benzoates such as benzoic acid, methyl benzoate, ethyl benzoate, benzyl benzoate and butyl benzoate; phenols such as O-phenylphenol, P-phenylphenol and octylphenol; salicylates such as salicylic acid, methyl salicylate, ethyl salicylate and butyl salicylate; hydrocarbons such as chlorobenzene, dichlorobenzene, trichlorobenzene, benzyl alcohol, dimethyl terephthalate, diphenyl, methyl naphthalene and tetrahydronaphthalene. Of all these examples, the most preferred are chlorobenzenes and methyl naphthalene. The application quantity of carrier may preferably be 5 – 15 wt% of the fibers when they are treated under atmospheric pressures at temperatures lower than 100° C and 1 – 10 wt% when treated under high pressures at temperatures higher than 100° C.

It may be possible to dye the polyester synthetic fiber products and to impart other various finishing effects to them simultaneously with modifying their surfaces by adding to the treating liquor a desired dyestuff and other various finishing agents which have an affinity to the polyester synthetic fibers to be treated. For example, a disperse dyestuff may be added for dyeing polyester fiber products; a disperse or acid dyestuff, for modified polyester fiber products which are dyeable with acid dyestuffs; a disperse or basic dyestuff, for modified polyester fiber products which are dyeable with basic dyestuffs. However, it is advised herein to check the type of dyestuff, the type and application quantity of water-soluble salts and pH of the treating liquor before adding a dyestuff, because some disperse dyestuff may be precipitated by the addition of water-soluble salts or decomposed in the alkaline pH range. Disperse dyestuffs having larger dyeing speeds are apt to result in an uneven dyeing and therefore it is advised to employ dyestuffs having smaller dyeing speeds. As for a convenient standard for selecting a dyestuff, a suitable dyestuff is such that has an apparent diffusion coefficient less than $2 \times 10^{-7}$ cm/min. and an activation energy more than 40 Kcal/mol when measured at 130° C by a film rolling method (reported by Sekido and Kojima in the "Journal of Fibers Society" vol. 21, 1965, p.644). These values, however, may be varied depending on whether an ordinary polyester or non-modified polyester is to be treated. An example of a dyestuff which may be employed is Latyl Yellow 3G (C.I. Disperse Yellow 54, C.I. 47020);

Other finishing agents usable by adding to the treating liquor of this invention are : ultraviolet absorbing agents such as hydroxybenzophenones and hydroxyphenylbenzotriazoles; anti-bacterial agents such as polyhalogenosalicylanilide, 2,4'-dihydroxybenzophenone, pentachlorophenyllaurate, dihydroxybenzoxazol-2-one and 5,5'-dichlorophenylmethane; flame retardants such as chlorine-containing phosphonate, bromine-containing phophonate, bromine-containing phosphate and triarylphosphite; and other bleaching agents, softening and smoothing agents and fluorescent brightening agents having hydrophobic property and affinity to polyester.

Acids and/or water-soluble salts employed in this invention for controlling the aggregation initiating temperature of the treating liquor are normally added during preparing said treating liquor. However, in a multi-purpose processing wherein other the processing agents are also used in combination, either one or both of the acids and water-soluble salts may be added during processing so as to maintain the stability of the treating liquor. When polyester fiber products are treated by this invention after having been treated with alkali to modify the surface structure thereof, then more remarkable effects may be obtained.

Now the invention will be described by the way of several Examples. However, it is to be noted that the scope of this invention is not limited to these Examples. In the following Examples various properties of the fabrics to be treated were measured by the following method and under following conditions:

1. Wicking property (sec): A time in which a water-drop dropped onto a cloth from a height of 10 mm above the fabric has been absorbed into the fabric completely.
2. Electric resistance ($\Omega$): Measured with a fabric electric conductivity measuring device (manufactured by Denpa Kogyo K. K.) at 22° C and in a relative humidity of 65%.
3. Frictional electrification voltage (V):

Test specimens were rubbed with a cotton cloth (shirting) for 2 minutes under conditions of 22° C and 65% relative humidity and then the electrified voltage was measured with a rotary statictester (manufactured by Koa Shokai).

4. Soil redeposition property: Test specimens were treated for 30 minutes at 70° C with a staining solution consisting of 0.01 parts of carbon black, 0.15 parts of beef tallow, 0.1 parts of soap and 100 parts of water, and then the reflectivity of the stained specimens was measured at a wavelength of 480 m$\mu$. The soil redeposition property was classified into 5 classes from class 1 (stained very much) to class 5 (stained not at all).

5. Washing conditions: Fabrics were washed with a household electric washing machine for 10 minutes in a 40° C 1g/$l$ aqueous solution of Marseille soap.

6. Degree of block copolymer exhaustion (%):

$$\frac{\text{Quantity of block copolymer exhausted by the fibers}}{\text{Quantity of applied block copolymer}} \times 100$$

EXAMPLE 1

Comparison of treating liquor stability

A polyester polyether block copolymer was prepared from terephthalic acid, isophthalic acid, ethylene glycol and polyethylene glycol (terephthalate units/isophthalate units = 65/35, terephthalate units + isophthalate units/polyethylene glycol units = 3.5/1, molecular weight of polyethylene glycol = 1,540, average molecular weight of the block copolymer = 6,000). Each of the liquor (pH 6) consisting of 10 g/l of a 15% aqueous dispersed liquid of said block copolymer and 2 g/l of a surface active agent as listed in Table 1 was introduced into a plurality of elongate test tubes. Then the resulting each liquors were heated within a thermostatic bath to measure their aggregation initiating temperature. The results are as shown in Table 1.

Table 1

| No. | Surface active agent employed | Concentration (g/l) | Aggregation initiating temperature (° C) |
|---|---|---|---|
| 1 | $C_{16}H_{33}O(CH_2CH_2O)_4$—H | 2 | 42 |
| 2 | $C_9H_{19}$—⟨⟩—$O(CH_2CH_2O)_6$—H | 2 | 42 |
| 3 | $C_{12}H_{25}OSO_3Na$ | 2 | 45 |
| 4 | $C_{16}H_{33}O(CH_2CH_2O)_4$—$SO_3NH_4$ | 2 | 80 |
| 5 | $C_{18}H_{37}O(CH_2CH_2O)_{20}$—$SO_3Na$ | 2 | 80 |
| 6 | $C_9H_{19}$—⟨⟩—$O(CH_2CH_2O)_6$—$SO_3NH_4$ | 2 | above 130 |
| 7 | $C_9H_{19}$—⟨⟩—$O(CH_2CH_2O)_6$—$SO_3Na$ | 2 | above 130 |
| 8 | $C_9H_{19}$—⟨⟩—$O(CH_2CH_2O)_{12}PO_3(C_2H_5)_2$ | 2 | 100 |
| 9 | Without surface active agent | — | 42 |

As is seen from this Table the dispersed liquors containing surface active agents Nos. 1 – 3 are deficient in stability and unsuitable for the purpose of this invention. By the addition of surface active agents Nos. 4 – 8, especially Nos. 6 and 7, the dispersed liquors are stabilized remarkably.

Preparation of the treating liquor of this invention and results of treatment

In a treating liquor (pH 6.2) consisting of 6 g/l of a 15% aqueous dispersed liquid of polyester polyether block copolymer, 0.5 g/l of a surface active agent

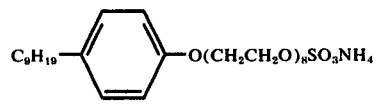

and 1 g/l of sodium chloride was dipped a woven fabric made of a polyethylene terephthalate fiber at a liquor ratio of 1 : 25 to treat it for 60 min. at 95° C. Then the woven fabric was dried. For comparison purpose the similar woven fabrics were also treated with a treating liquor which contains no surface active agent (Comparison Example A) and with another treating liquor which contains a surface active agent but not sodium chloride. The properties exhibited by the thusly treated fabrics are as listed in Table 2.

Table 2

| Treatment | Surface active agent (g/l) | Sodium chloride (g/l) | Aggregation initiating temperature (° C) | Degree of block copolymer exhaustion (%) | Wicking property (sec.) Initial | Wicking property (sec.) After 5 wash-dry cycles | Electric resistance ($\Omega$) Initial | Electric resistance ($\Omega$) After 5 wash-dry cycles |
|---|---|---|---|---|---|---|---|---|
| Comparison Example A | — | — | 42 | 5 | 0 | 300< | $5 \times 10^9$ | $1 \times 10^{12}<$ |
| Present Invention | 0.5 | 1 | 90 | 35 | 0 | 1 | $9 \times 10^7$ | $2 \times 10^9$ |
| Comparison Example B | 0.5 | — | 130< | 2 | 0 | 300< | $3 \times 10^9$ | $1 \times 10^{12}$ |
| Untreated fabric | — | — | — | — | 300< | 300< | $1 \times 10^{12}<$ | $1 \times 10^{12}<$ |

It was found from these experiments that excellent hydrophilic and antistatic properties having sufficient uniformity and durability were obtained for the first time by the treatment of this invention.

EXAMPLE 2

In a treating liquor (aggregation initiating temperature, 65° C) consisting of 10 g/l of a 15% aqueous dispersed liquid of such block copolymer as used in Example 1, 1 g/l of

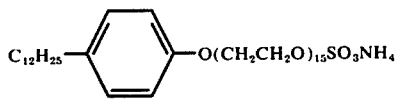

and 5 g/l of ammonium sulfate
was dipped a woven fabric made of polyethylene terephthalate/isophthalate (9 : 1). Then the treating liquor was heated to various predetermined temperatures at a rate of 3° C/min. to treat the woven fabric for 60 min at those temperatures. The properties exhibited by the thusly treated fabrics are as listed in Table 3.

Table 3

| Treating temperature (° C) | Degree of block copolymer exhaustion (%) | Wicking property (sec.) Initial | Wicking property (sec.) After 5 wash-dry cycles | Electric resistance ($\Omega$) Initial | Electric resistance ($\Omega$) After 5 wash-dry cycles |
|---|---|---|---|---|---|
| 60 | 1> | 0 | 150 | $5 \times 10^9$ | $1 \times 10^{12}<$ |
| 70 | 25 | 0 | 15 | $2 \times 10^8$ | $7 \times 10^{10}$ |
| 80 | 32 | 0 | 3 | $2 \times 10^8$ | $3 \times 10^{10}$ |
| 95 | 35 | 0 | 1 | $9 \times 10^7$ | $5 \times 10^9$ |
| Untreated fabric | — | 300< | 300< | $1 \times 10^{12}<$ | $1 \times 10^{12}<$ |

It was found from the foregoing experiments that, when treated at 60° C, no durable property was imparted to the woven fabric, whereas when treated at temperatures above 70° C, excellent properties were imparted to the woven fabric.

EXAMPLE 3

Preset and scoured polyethylene terephthalate tricot was dipped into a treating liquor as defined below and then the treating liquor was heated to 95° C at a rate of 5° C/min. to treat said tricot for 30 min. at that temperature. After that, 2 g/l of sodium chloride was added to the treating liquor and the tricot was treated for another 30 min. By use of an aqueous solution consisting of 1 g/l of sodium hydrosulfite and 1 g/l of sodium carbonate, the tricot was then subjected to a reductive rinsing for 20 min. at 60° C which was followed by washing with hot water. Then the tricot was boiled for 20 minutes in a 0.0002% aqueous solution of C.I. Disperse Blue 54 for blueing it and, after having been subjected to a centrifugal drying, the tricot was subjected to a tentering and drying process for 30 sec. at 150° C.

Treating liquor
Neo-White (sodium chlorite bleaching agent manufactured by Daito Phermaceutical Industries Co., Ltd.)  1% owf
Mika-White ATN (C.I. Fluorescent Brightener 162 : 1, manufactured by Mitsubishi Chemical Industries, Ltd.)  1% owf
Teryl Carrier C-11 (chlorobenzene carrier manufactured by Meisei Chemical Industries, Ltd.)  10% owf
Polyester polyether block copolymer dispersed liquid as employed in Example 1  6 g/l
  1 g/l $C_9H_{19}-\bigcirc-O(CH_2CH_2O)_{10}PO_3(H)NH_4$ pH 3.5, adjusted with acetic acid
Liquor ratio, 1 : 25
Aggregation initiating temperature after addition of sodium chloride, 80° C For the comparison purpose, polyethylene terephthalate tricot which had been preset, scoured, fluorescent-brightened and finalset was dipped in a treating liquor consisting of 20 parts of polyester polyether block copolymer dispersed liquid as used in Example 1 and 80 parts of water (conventional method). After having been squeezed to the wet pick up of 100%, the tricot was dried for 5 min. at 80° C and then subjected to a heat treatment for 3 min. at 160° C.

Properties exhibited by the thusly treated tricots (at the time after having been washed for 5 cycles) are as shown in comparison in Table 4.

Table 4

| Treatment | Wicking property (sec.) | Electric resistance ($\Omega$) | Frictional electrification voltage (V) | Soil redeposition property |
|---|---|---|---|---|
| Present Invention | 2 | $1 \times 10^9$ | 50 | 70% (class 4.5) |
| Conventional Method | 25 | $5 \times 10^{11}$ | 1000 | 20% (class 2) |

Table 4-continued

| Treatment | Wicking property (sec.) | Electric resistance ($\Omega$) | Frictional electrification voltage (V) | Soil redeposition property |
|---|---|---|---|---|
| Untreated tricot | 300< | $1 \times 10^{12}$< | 2000 | 5% (class 1) |

The foregoing experiments showed that a uniform fluorescent brightening effect and highly durable hydrophilic, antistatic and stain removing properties effects were obtained by the method of this invention.

EXAMPLE 4

A polyester polyether block copolymer (average molecular weight, approx. 6,500) consisting of 120 parts of dimethylterephthalate, 30 parts of dimethylisophthalate, 120 parts of ethylene glycol and 340 parts of polyethylene glycol monophenylether (average molecular weight, 3,100) was dispersed into water to prepare a 10% aqueous dispersed liquor of said polyester polyether block copolymer (aggregation initiating temperature under conditions where no surface active agent is used, 55° C). An aqueous solution consisting of 10 g/l of said 10% polyester polyether block copolymer dispersed aqueous liquor, 0.03% owf of Sumikalon Red S-GG (C.I. Disperse Red 135 manufactured by Sumitomo Chemical Co., Ltd.; diffusion coefficient at 130° C, $3 \times 10^{-8}$ cm/min.; activation energy, 47.5 Kcal/mol), 10% owf of Polyescar DS (methylnaphthalene carrier manufactured by Soryu Phermaceutical Industries, Ltd.), 3 g/l of

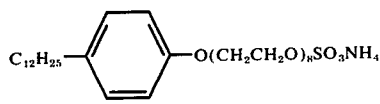

(used as a surface active agent)
and 1 g/l of ammonium sulfate was prepared and adjusted to pH 3.6 with acetic acid. 1,000 l of the thusly prepared treating liquor was introduced into a liquid current type dyeing machine and, after introduction of 40 kg of polyester texturized yarn tricot, heated to 130° C at a rate of 5° C/min. to thereby treat said tricot at that temperature for 60 min.

The treated tricot was then subjected to a reductive rinsing for 20 min. at 60° C by use of an aqueous solution consisting of 1 g/l of sodium hydrosulfite and 1 g/l of sodium carbonate and washed with water, dried and set for 30 sec. at 150° C.

Similar treatments were effected by use of a treating liquor which was identical with the aforementioned treating liquor excepting that Polyescar DS, or a dyeing carrier, was eliminated and by use of another treating liquor to which neither ammonium sulfate nor acetic acid were added (Comparison Examples). The results of the foregoing experiments are as shown in Table 5.

Table 5

| | Treating liquor | | Wicking property (sec.) | | | Electric resistance ($\Omega$) | | |
|---|---|---|---|---|---|---|---|---|
| | Carrier | Aggregation initiating temperature (° C) | Initial | After 5 wash-dry cycles | After 20 wash-dry cycles | Initial | After 5 wash-dry cycles | After 20 wash-dry cycles |
| Present Invention | Not employed | 110 | 0 | 5 | 7 | $5 \times 10^7$ | $5 \times 10^9$ | $8 \times 10^9$ |
| | employed | 110 | 0 | 1 | 2 | $4 \times 10^7$ | $8 \times 10^8$ | $1 \times 10^9$ |
| Comparison Example | employed | 140< | 0 | 50 | 120 | $5 \times 10^{10}$ | $5 \times 10^{11}$ | $1 \times 10^{12}$ |
| Untreated tricot | | 300< | 300< | 300< | | $1 \times 10^{12}$< | $1 \times 10^{12}$< | $1 \times 10^{12}$< |

These experiments showed that the dipping treatment of this invention allowed to dye a tricot evenly simultaneously with giving highly durable hydrophilic and antistatic properties to the tricot. It was also found that by employment of a carrier these modifying effects were further improved. In this case, however, when ammonium sulfate and acetic acid were not added together with a carrier, the resulting modifying effects were reduced extremely.

EXAMPLE 5

1,000 l of an aqueous treating liquor was prepared from 10 g/l of the polyester polyether block copolymer dispersed aqueous liquid as used in Example 4, 0.3% owf of Sumikalon Red

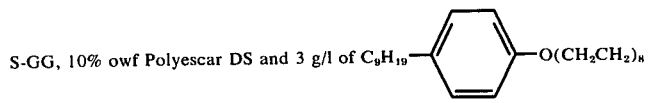

S-GG, 10% owf Polyescar DS and 3 g/l of $C_9H_{19}$— ⌬ —$O(CH_2CH_2)_n$ $SO_3Na$ (used as a surface active agent). The treating liquor was introduced into a liquid current type dyeing machine and, after introduction of 40 kg of polyester texturized yarn tricot, heated to 130° C at a rate of 5° C/min. for treating the tricot for 30 min. at 130° C. At the point when the dyestuff had been exhausted mostly, formic acid was added to adjust the treating liquor to pH 3 and the tricot was treated for another 30 min. at that temperature (Method A of this invention). On the other hand, the similar treatment was carried out for 30 min. at 130° C with adding 3 g/l of ammonium sulfate in place of formic acid and without adding neither formic acid nor ammonium sulfate. Each of the thusly treated tricots was then reductively rinsed, washed with water and dried. The results of these experiments are as shown in Table 6.

Table 6

| | Added agent | Aggregation initiating temperature (°C) | Degree of copolymer exhaustion (%) | Wicking Property (sec.) Initial | Wicking Property (sec.) After 5 wash-dry cycles | Wicking Property (sec.) After 20 wash-dry cycles | Electric resistance ($\Omega$) Initial | Electric resistance ($\Omega$) After 5 wash-dry cycles | Electric resistance ($\Omega$) After 20 wash-dry cycles |
|---|---|---|---|---|---|---|---|---|---|
| Method A of this invention | formic acid | 105 | 58 | 0 | 1 | 8 | $2 \times 10^8$ | $7 \times 10^9$ | $5 \times 10^{10}$ |
| Method B of this invention | ammonium sulfate | 105 | 61 | 0 | 1 | 2 | $1 \times 10^8$ | $2 \times 10^9$ | $5 \times 10^9$ |
| Comparison Example | — | 140< | 3 | 0 | 25 | 130 | $5 \times 10^{10}$ | $5 \times 10^{11}$ | $1 \times 10^{12}<$ |
| Untreated tricot | — | — | — | 300< | 300< | 300< | $1 \times 10^{12}<$ | $1 \times 10^{12}<$ | $1 \times 10^{12}<$ |

The foregoing experiments showed that according to the treatment of this invention the exhaustion degree of processing agent was high and evenly dyed tricot which had highly durable excellent antistatic, hydrophilic and stain removing properties was obtained.

EXAMPLE 6

A broadcloth made of Dacron T-65 (polyester fiber which is dyeable with cation dyestuffs, manufactured by E. I. du Pont de Nemours & Co., Inc.) was dipped in a treating liquor as defined below. Then the treating liquor was heated to 130° C at a rate of 5° C/min. to treat the broadcloth for 60 min. at that temperature.

```
Treating liquor
Sandocryl Navy B-BL (C.I. Basic Blue 41 manufactured
  by Sandoz Ltd.)                                         1% owf
Polyester polyether block copolymer dispersed aqueous
  liquid as used in Example 4                            10 g/l
                                                          8 g/l
```

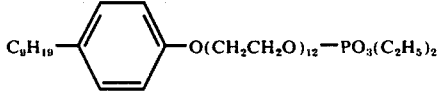

$C_9H_{19}\text{—}\langle\text{—}\rangle\text{—O(CH}_2\text{CH}_2\text{O)}_{12}\text{—PO}_3(C_2H_5)_2$

```
Sodium chloride                                           1 g/l
85% acetic acid                                           2 g/l
Liquor ratio, 1 : 20
pH, 4.0
Aggregation initiating temperature, 105° C
```

The cloths having been treated in the foregoing manner were then soaped for 30 min. at 60° C in an aqueous solution containing 1 g/l of Scoreroll No. 400 (nonion washing agent manufactured by Kao Soap Co., Ltd.), washed with water, dried and finally heat-set for 1 min. at 160° C. The thusly treated cloths had antistatic and hydrophilic properties as shown in Table 7.

Table 7

| Wash-dry cycles | Treated cloth Wicking property (sec.) | Treated cloth Electric resistance ($\Omega$) | Untreated cloth Wicking property (sec.) | Untreated cloth Electric resistance ($\Omega$) |
|---|---|---|---|---|
| 0 | 0.2 | $3 \times 10^8$ | 300< | $1 \times 10^{12}<$ |
| 5 | 1 | $8 \times 10^8$ | — | — |
| 10 | 3 | $5 \times 10^9$ | — | — |
| 20 | 5 | $1 \times 10^{10}$ | 300< | $1 \times 10^{12}<$ |

Table 8

| Wash-dry cycles | Treated cloth Wicking property (sec.) | Treated cloth Electric resistance ($\Omega$) | Untreated cloth Wicking property (sec.) | Untreated cloth Electric resistance ($\Omega$) |
|---|---|---|---|---|
| 0 | 0.5 | $5 \times 10^8$ | 300< | $1 \times 10^{12}<$ |
| 5 | 1 | $8 \times 10^8$ | — | — |
| 10 | 4 | $1 \times 10^9$ | — | — |
| 20 | 5 | $5 \times 10^9$ | 300< | $1 \times 10^{12}<$ |

The foregoing experiments showed that the method of this invention allowed to dye a cloth evenly and, at the same time, to impart the cloth highly durable antistatic and hydrophilic properties. The exhaustion degree of the polyester polyether block copolymer reached 64%.

EXAMPLE 7

4.5 parts of polyester (limiting viscosity obtained when dissolved in 30° C chloroform, 0.6) prepared from polycondensation between 1 mol of dimethylterephthalate and 2.5 mol of 2-methyl-2'-diethylaminomethyl-1, 3-propylene glycol by ester exchange was mixed and fused with 95.5 parts of polyethylene terephthalate which is commonly employed for manufacturing fibers. Then with ordinary spinning and drawing processes the mixture was formed into yarns, which were false-twisted and knitted into a mock milano rib stitch fabric. The resulting fabric was dipped in a treating liquor as defined below, which was then heated to 120° C at a rate of 5° C/min. to treat said fabric for 60 min. at that temperature.

```
Treating liquor
Nylosan Red B-BL (C.I. Acid Red 57 manufactured by
  Sandoz Ltd.)                                            1% owf
Polyester polyether block copolymer dispersed aqueous
  liquid as used in Example 4                            10 g/l
                                                          0.5 g/l
```

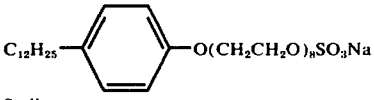

$C_{12}H_{25}\text{—}\langle\text{—}\rangle\text{—O(CH}_2\text{CH}_2\text{O)}_n\text{SO}_3\text{Na}$

```
Sodium acetate                                            1 g/l
Acetic acid                                               2 g/l
Liquor ratio, 1 : 20
pH, 4.0
Aggregation initiating temperature, 95° C
```

Subsequently, the fabric was soaped, washed with water and air-dried. The results of the foregoing experiments are as listed in Table 8.

The foregoing experiments showed that the method of this invention allowed to dye a fabric evenly and, at the same time, to impart highly durable antistatic and hydrophilic properties to the fabric. The exhaustion degree of the polyester polyether block copolymer reached 65%.

EXAMPLE 8

An underwear knitted from scoured polyethylene terephthalate threads was dipped in a treating liquor as defined below at a liquor ratio of 1 : 20. After having treated at 97° C for 60 min., the underwear was reductively rinsed, washed with water and then subjected to a final setting process.

```
Treating liquor
Sumikalon Blue S-2GL*¹⁾ (C.I. Disperse Blue 54
```

| | |
|---|---|
| manufactured by Sumitomo Chemical Co., Ltd.) | 1% owf |
| Polyescar DS | 10% owf |
| 10% dispersed liquid of polyester polyether block copolymer*[2] | 10 g/l |
| | 0.3 g/l |
| 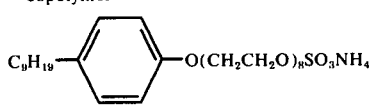 | |
| Dichloroglycerine (1,3-dichloropropanol) | 5 g/l |

*[1]Diffusion coefficient at 130° C, 5 × 10⁻⁸ cm³/min.; activation energy, 46.5 Kcal
*[2]A block copolymer (average molecular weight, approx. 5,000; aggregation initiating temperature of an aqueous dispersed liquid of the block copolymer, approx. 58° C) consisting of 120 parts of dimethylterephthalate, 30 parts of dimethylisophthalate, 120 parts of ethylene glycol and 340 parts of polyethylene glycol monomethylether (average molecular weight, approx. 3,100).

When having been washed for 5 cycles, the thusly treated fabric presented properties as listed in Table 9.

Table 9

| | Wicking property (sec.) | Electric resistance (Ω) | Frictional electrification voltage (V) | Soil redeposition property (class) |
|---|---|---|---|---|
| Treated fabric | 1 | 8 × 10⁹ | 70 | 4 |
| Untreated fabric | 300< | 1 × 10¹² | 2800 | 1 |

The experiment showed that with the treatment of this invention highly durable hydrophilic, antistatic and stain removing properties could be imparted to the fabric.

EXAMPLE 9

An underwear knitted from scoured polyethylene terephthalate threads was dipped in a treating liquor as defined below at a liquor ratio of 1 : 20, and then the treating liquor was heated at a rate of 10° C/min. to treat the underwear at various preselected temperatures as listed in Table 10 for 60 min. After that, the underwear was reductively rinsed, washed with water and final-set.

| | |
|---|---|
| Treating liquor | |
| Sumikalon Blue 2GL | 1% owf |
| Polyescar DS | 5% owf |
| 10% dispersed liquid of the polyester polyether block copolymer as used in Example 8 | 10 g/l |

| | |
|---|---|
| 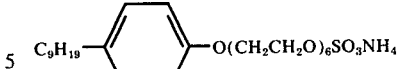 | 0.5 g/l |
| Adsorption promoting agent or aggregation initiating agent | various quantities as shown in Table 10 |

The properties exhibited by the thusly treated fabric at the finished point and at the times after having been washed for 5 and 20 cycles are as shown in Table 10.

Table 10

| Adsorption promoting agent | | Treating temp. (°C) | Wicking property (sec.) | | | Electric resistance (Ω) | | | Evenness of dyeing* |
|---|---|---|---|---|---|---|---|---|---|
| Acid | Water-soluble salt | | Initial | after 5 wash-dry cycles | after 20 wash-dry cycles | Initial | after 5 wash-dry cycles | after 20 wash-dry cycles | |
| Acetic acid, 2 g/l | — | 95 | 0 | 2 | 20 | 3 × 10⁸ | 5 × 10⁹ | 3 × 10¹¹ | o |
| " | — | 110 | 0 | 2 | 14 | 4 × 10⁸ | 3 × 10⁹ | 5 × 10¹¹ | Δ |
| " | — | 130 | 0 | 2 | 17 | 2 × 10⁸ | 6 × 10⁹ | 2 × 10¹¹ | Δ |
| 1,3-dichloropropanol, 3g/l | — | 95 | 0 | 3 | 8 | 1 × 10⁸ | 8 × 10⁹ | 3 × 10¹¹ | ◎ |
| " | — | 110 | 0 | 1 | 3 | 7 × 10⁷ | 1 × 10⁹ | 8 × 10⁹ | ◎ |
| " | — | 130 | 0 | 1 | 2 | 6 × 10⁷ | 8 × 10⁸ | 5 × 10⁹ | ◎ |
| " | Sodium chloride, 1g/l | 95 | 0 | 2 | 5 | 7 × 10⁷ | 5 × 10⁹ | 3 × 10¹⁰ | ◎ |
| " | " | 110 | 0 | 1 | 1 | 4 × 10⁷ | 5 × 10⁸ | 5 × 10⁹ | ◎ |
| " | " | 130 | 0 | 1 | 1 | 4 × 10⁷ | 4 × 10⁸ | 3 × 10⁹ | ◎ |
| Untreated fabric | — | | 300< | 300< | 1 × 10¹²< | 1 × 10¹²< | 1 × 10¹²< | | ◎ |

* Evenness of dyeing: ◎ ... very good; o ... good; Δ ... fairly good

As is apparent from this Table, a high evenness of dyeing and highly durable antistatic property can be obtained by adjusting the aggregation initiating temperature through addition of a latent acid. Also the antistatic property imparted to the fabric is increased as the treating temperature thereof is elevated, on the one hand, and by use of a latent acid and a neutral salt in combination, on the other. In contrast with this, when the aggregation initiating temperature was adjusted by the addition of only a free acid (adjusted to 80° C by the addition of acetic acid), the durability of antistatic property could not be increased even when the fabric was treated at higher temperatures. The reason may be explained as follows: In high temperatures the treating agent is aggregated into relatively large particles before it has been diffused and penetrated into the fibers. Thus even when adsorbed onto the surface of fibers, the treating agent can hardly penetrate into the fibers. This means that the treatment presents only limited fastness to washing. Besides, in such a treatment the treating agent is apt to be adsorbed unevenly and, when effecting a simultaneous dyeing, the evenness of dyeing is reduced.

EXAMPLE 10

A muff prepared by cheese-winding a polyester texturized yarn (150 denier/30 filament) at a winding density of 0.3 g/cm³ was introduced into an overmier type high pressure dyeing machine and scoured in an aqueous solution of a nonion scouring agent. Then a treating liquor as defined below was introduced, heated at 130° C at a rate of 2° C and maintained at that temperature for 40 min. During this period the flowing direction of the liquid was inverted at intervals of 3 min. from IN to OUT and from OUT to IN. After terminating this process, the liquid was cooled gradually to 80° C and discharged; whereas the treated yarn was reductively rinsed, washed with water and dried.

| | |
|---|---|
| Treating liquor | |
| Sumikalon Blue S-2GL | 1% owf |
| Polyescar DS | 3% owf |
| 10% dispersed liquid of polyester polyether block copolymer as used in Example 8 | 10 g/l |
| | 0.5 g/l |
| 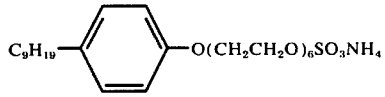 | |
| 80% acetic acid | 1 g/l |
| Ammonium sulfate | 0.5 g/l |

The experiments showed that with the method of this invention the thread could be dyed evenly and, at the same time, obtained highly durable water-absorbing and antistatic properties.

What is claimed is:

1. A method for modifying polyester synthetic fiber products, comprising the steps of dipping said fiber products in a treating liquor having an aggregation initiating temperature in the range of 65°–125° C and then heating said treating liquor to 100° C to 140° C and to temperatures at least 1° C higher than its aggregation initiating temperature to thereby heat said fiber products, said treating liquor being prepared by adding to an aqueous dispersed liquid of a polyester polyether block copolymer, which is prepared from an aromatic dicarboxylic acid or a lower alkyl ester thereof, a lower alkylene glycol and a polyalkylene glycol, (a) an emulsifying amount of a surface active agent as expressed by the following general formula (I):

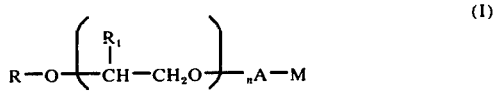

where; R is an alkyl, alkenyl or alkylaryl group; $R_1$ is a hydrogen atom or a methyl group; A is a $-SO_3$, $-(CH_2)_mSO_3$ or $PO_3$, $m$ is an integer of 2 or 3; M is a hydrogen atom or an ammonium, substituted ammonium or lower alkyl group or an alkali metal; $n$ is an integer in the range of 4–20 and (b) a member selected from the group consisting of at least one acid or latent acid which forms an acid upon being hydrolyzed, at least one water-soluble salt and mixtures thereof, said salt being made up of cations selected from the group consisting of $NH_4^+$, $Na^+$, $Li^+$, $K^+$ and $Mg^{++}$ and anions selected from the group consisting of $SO_4^{--}$, $CH_3COO^-$, $Cl^-$ and $Br^-$, said member being used in an amount to increase the affinity and sorption power of said block copolymer to the polyester synthetic fiber products, and in cases wherein a water-soluble salt is used, said salt being also used in salting out proportions.

2. A method for modifying polyester synthetic fiber products according to claim 1, wherein said treating liquor further contains a dyeing carrier for the polyester fibers.

3. A method according to claim 1, wherein said polyester polyether block copolymer is dispersible in water and prepared from terephthalic acid and/or isophthalic acid or one or more lower alkylester of these acids, a lower alkylene glycol and a polyalkylene glycol having a molecular weight in the range of 600 – 12,000, the molar ratio between the phthalate units and polyoxyalkylene units being in the range of 2 : 1 – 15 : 1.

4. A method according to claim 1, wherein said polyester polyether block copolymer is dispersible in water and prepared from ethylene terephthalate, ethylene isophthalate and polyethylene glycol monoalkylether or polyethylene glycol monophenylether (molecular weight, 1,000 – 5,000), the molar ratio between the terephthalate units and isophthalate units being in the range of 9 : 1 – 5 : 5 and the molar ratio between the phthalate units and polyoxyethylene units, in the range of 3 : 1 – 8 : 1.

5. A method according to claim 1, wherein said surface active agent is either

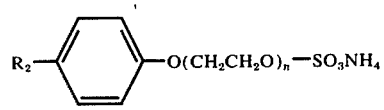

or

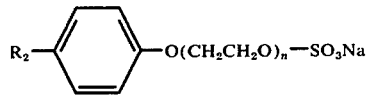

where, R is an alkyl group having a carbon number of more than 3, and up to 18; $n$ is an integer in the range of 4–20.

6. A method according to claim 1, wherein said surface active agent is used in the quantity of 0.3 – 20 g per each $l$ of said treating liquor.

7. A method according to claim 1, wherein component (b) is a mixture of one or more acids and one or more water-soluble salts.

8. A method according to claim 1, wherein the treating temperature of said treating liquor is higher than the aggregation initiating temperature thereof by 5° – 25° C.

9. A method according to claim 1, wherein component (b) is a latent acid selected from the group consisting of glycolacetate, glycoldiacetate, monoacetin, diacetin, triacetin, monochloroglycerin, dichloroglycerin, lactones and sultones.

10. A method according to claim 1, wherein the treating liquor contains one or more hydrophobic processing agents selected from the group consisting of dyestuffs, softening agents and flame retardants, which have an affinity to the polyester synthetic fibers to be treated.

11. A method according to claim 2, wherein the treating liquor contains one or more hydrophobic processing agents selected from the group consisting of dyestuffs, softening agents and flame retardants, which have an affinity to the polyester synthetic fibers to be treated.

12. A method according to claim 1, wherein said polyester synthetic fiber products are filaments, fibers, woven fabrics, knitted fabrics and nonwoven fabrics made from aromatic polyesters selected from the group consisting of polyethylene terephthalate, polyethylene terephthalate isophthalate, polyethylene terephthalate butyleneterephthalate and polyethylene terephthalate parahydroxybenzoate, blended fiber products of said aromatic polyester fibers and one or more fibers selected from the group consisting of natural fibers, regenerated fibers, and synthetic fibers other than said polyester fibers; and other various modified polyester fibers selected from the group consisting of those polyester fibers dyeable with acid dyestuffs, fibers dyeable with basic dyestuffs, flame retardant polyester fibers and antistatic polyester fibers.

13. A method according to claim 5, wherein $R_2$ is an alkyl group having a carbon number of 9-18.

14. A method according to claim 2, wherein the dyeing carrier is selected from the group consisting of benzoic acid, methyl benzoate, ethyl benzoate, benzyl benzoate, butyl benzoate, O-phenylphenol, P-phenylphenol, octylphenyl, salicylic acid, methyl salicylate, ethyl salicylate, butyl salicylate, chlorobenzene, dichlorobenzene, trichlorobenzene, benzyl alcohol, dimethyl terephthalate, diphenyl, methyl naphthalene and tetrahydronaphthalene.

15. A method according to claim 1, wherein component (b) is an acid selected from the group consisting of formic acid, acetic acid, oxalic acid, sulfamic acid, monochloroacetic acid, hydrochloric acid and phosphoric acid.

16. A method according to claim 1, wherein the application quantity of the block polymer is 0.02-5.0 wt.% of the polyester synthetic quantity; the surface active agent is used in a quantity of 0.01-50g. per liter of said treating liquor and the adsorption promoting agent or aggregation temperature is used in such amounts that the pH of the treating liquor is from 2-10.

17. A method according to claim 16, wherein component (b) is an acid selected from the group consisting of formic acid, acetic acid, oxalic acid, sulfamic acid, monochloroacetic acid, hydrochloric acid and phosphoric acid added in such amounts that the pH of the treating liquor is 3-6.

18. A method according to claim 16, wherein component (b) is a latent acid selected from the group consisting of glycolacetate, glycoldiacetate, monoacetin, diacetin, triacetin, monochloroglycerin, dichloroglycerin, lactones and sultones added in such amounts that the pH of the treating liquor is 3-6.

19. A method according to claim 16, wherein the adsorption promoting agent is a water-soluble salt selected from the group consisting of ammonium sulfate, sodium sulfate, sodium acetate, ammonium chloride and sodium chloride in such amounts that the pH of the treating liquor is 3-6.

* * * * *